United States Patent [19]
Dartnall et al.

[11] Patent Number: 5,492,342
[45] Date of Patent: Feb. 20, 1996

[54] SEAL

[75] Inventors: William J. Dartnall, Applecross; Stanley Nowak, Leeming, both of Australia

[73] Assignee: Dartnall Engineering & Innovation Pty Ltd, Osborne Park, Australia

[21] Appl. No.: 310,812

[22] Filed: Sep. 22, 1994

Related U.S. Application Data

[63] Continuation of Ser. No. 974,245, Nov. 10, 1992, abandoned.

[30] Foreign Application Priority Data

Nov. 12, 1991 [AU] Australia ................................ PK9405

[51] Int. Cl.⁶ ...................................................... F16J 15/16
[52] U.S. Cl. ........................ 277/142; 277/165; 277/182; 277/186; 277/203
[58] Field of Search ...................................... 277/138, 142, 277/143, 165, 182, 183, 184, 186, 203, 212 FB, 197

[56] References Cited

U.S. PATENT DOCUMENTS

| | | | |
|---|---|---|---|
| 791,073 | 5/1905 | Callan | 277/203 X |
| 2,126,007 | 8/1938 | Guiberson et al. | 277/123 X |
| 2,321,250 | 6/1943 | Russell | 277/212 FB X |
| 2,420,721 | 5/1947 | Pennella | 277/102 X |
| 2,444,211 | 6/1948 | Wager | 277/4 |
| 3,442,518 | 5/1969 | Henshaw | 277/203 X |
| 3,490,775 | 1/1970 | Henshaw | 277/203 X |
| 3,529,836 | 9/1970 | Hyde | 277/203 X |
| 3,874,679 | 4/1975 | Keller | 277/165 X |
| 4,516,959 | 5/1985 | Krude | 277/212 FB X |
| 4,717,160 | 1/1988 | Zitting et al. | 277/102 X |

FOREIGN PATENT DOCUMENTS

| | | | |
|---|---|---|---|
| 1200245 | 12/1959 | France | 277/203 |
| 302777 | 10/1992 | Japan | 277/203 |
| 195820 | 4/1923 | United Kingdom | 277/197 |
| 8906762 | 7/1989 | WIPO | 277/203 |

*Primary Examiner*—William A. Cuchlinski, Jr.
*Assistant Examiner*—John L. Beres
*Attorney, Agent, or Firm*—Harness, Dickey & Pierce

[57] ABSTRACT

A seal for use between a pair of elements (11 and 12) which are capable of relative movement with respect to each other where one element (11) has a substantially circular cross section, said seal comprising a bush (16) configured to be received in close abutting relationship with the one element (11) and being associated at one end with a sealing element (17) of corresponding cross-section, said sealing element (17) having a helical configuration, the opposed axial faces of the helix are of complementary configuration and are in close abutting relationship, the opposed axial faces of the helix and each bush are of a complementary configuration and are in close abutting relationship, said bush (16) and sealing element (17) being integral and being formed of a resilient wear resistant material having a low coefficient of sliding friction and a high modulus of rigidity, said seal further comprising an elastomeric sleeve (23) extending over the radial face of the sealing element and of an adjacent portion of the bush which is remote from the one element, said sleeve (23) applying a radial force to the seal in the direction of the one element and an axially compressive force on the seal, the bush (16) being adapted to be supported by the other element.

12 Claims, 5 Drawing Sheets

SEAL

This is a continuation of U.S. patent application Ser. No. 07/974,245, filed Nov. 10, 1992, entitled IMPROVED SEAL, now abandoned.

BACKGROUND OF THE INVENTION

This invention relates to a seal and in particular relates to a seal which is to be used in providing sealing engagement between two members which are capable of relative movement with respect to each other.

One particular application of the invention relates to a seal which can be used to provide a seal between two elements capable of relative rotation with respect to each other while another particular application of the invention relates to a seal which can be used to provide a seal between two elements capable of relative axial movement with respect to each other such as with an axially reciprocating shaft.

SUMMARY OF THE INVENTION

In one form the invention resides in a seal for use between a pair of elements which are capable of relative movement with respect to each other where one element has a substantially circular cross section, said seal comprising a bush configured to be received in close abutting relationship with the one element and being associated at one end with a sealing element of corresponding cross-section, said sealing element having a helical configuration, opposed axial faces of the helix are of complementary configuration and are in close abutting relationship, the opposed axial faces of the helix and each bush are of a complementary configuration and are in close abutting relationship, said bush and sealing element being integral and being formed of a resilient wear resistant material having a low coefficient of sliding friction and a high modulus of rigidity, said seal further comprising an elastomeric sleeve extending over the radial face of the sealing element and of an adjacent portion of the bush which is remote from the one element, said sleeve applying a radial force to the seal in the direction of the one element and an axially compressive force on the seal, the bush being adapted to be supported by the other element.

According to a preferred feature of the invention a further bush is located at the other end of the sealing element and is integral with the other end of the sealing element.

According to a further preferred feature the sealing element has the configuration of a single helix having a length in excess of one revolution.

According to an alternative preferred feature the sealing element has the configuration of a double helix each helix being 180° out of phase with the other and having a length in excess of one half of a revolution.

According to a preferred feature of the invention one bush is circumferentially discontinuous and is capable of some resilient radial movement. Preferably the further bush comprises the one bush.

According to a further preferred feature of the invention the radial face of the adjacent portion of each bush is formed with an annular protrusion.

BRIEF DESCRIPTION OF THE DRAWINGS

The invention will be more fully understood in the light of the following description of one specific embodiment. The description is made with reference to the accompanying drawings of which.

DETAILED DESCRIPTION OF THE PREFERRED EMBODIMENTS OF THE INVENTION

Figure 1:
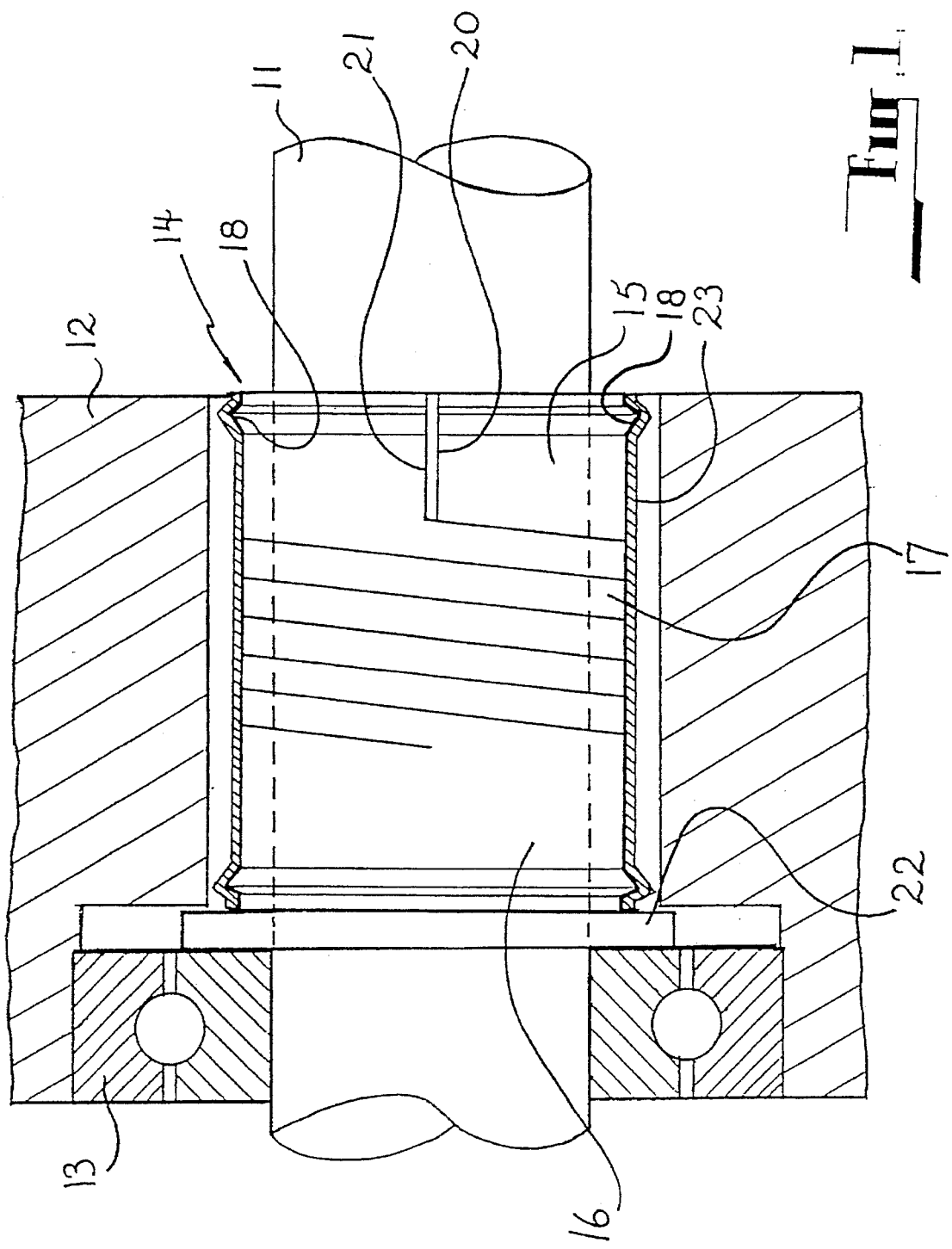
FIG. 1 is a schematic sectional elevation of a seal according to the embodiment in position between a pair of elements.
Figure 2:
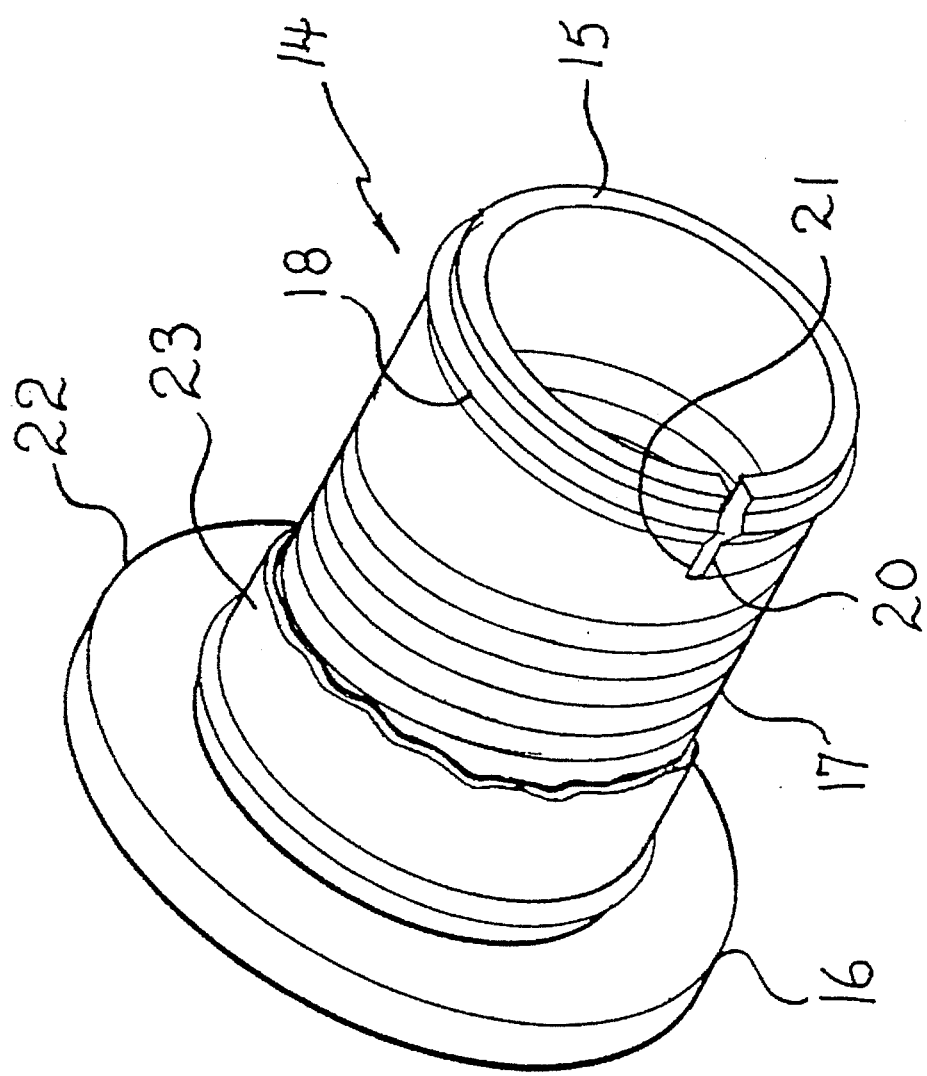
FIG. 2 is a schematic partially cutaway isometric view of the seal according to the embodiment.

The seal according to the embodiment is intended for use in a circumstance where it is necessary to provide a seal around a rotating shaft 11 which is supported from a housing 12 through a bearing 13. The seal 14 has a generally cylindrical configuration, is adapted to be slidably received over the shaft 11 and to be supported from the housing 12.

The seal 14 comprises a pair of end bushes 15 and 16 which are axially spaced from each other by a sealing element 17 where the end bushes 15 and 16 and the sealing element 17 are formed to be integral with each other.

The sealing element 17 comprises a helix and one end of the helix is integral with one end bush 15 while the other end of the helix is integral with the other end bush 16. The bushes 15 and 16 and the sealing element 17 are formed of a resilient wear resistant material which has a substantially low coefficient of sliding friction and a high modulus of rigidity. In addition the opposed axial faces of the helix and the opposed axial faces of the helix and the bushes are of a complementary configuration and are in close abutting relationship with each other.

The outer face of each bush 15 and 16 is formed with an annular ridge 18 which is formed to have a barbed configuration having a gently sloping face proximate the sealing element 17 and a sharply inclined or perpendicular face remote from the sealing element. The one bush 15 which is remote from the bearing 13 is also discontinuous circumferentially such that it has two radial end faces 20 and 21 which allow for some radial contraction and/or expansion of the one bush 15. The other bush 16 is formed at its outer end with a radially directed flange 22 which is intended to be clampingly engaged between the bearing 13 and the housing 12 to provide for retention of the seal within the other element 12.

The seal further comprises an elastomeric sleeve 23 which is received over the exterior face of the sealing element 17 and of the bushes including the annular ridges 18 thereon. The barbed configuration of each ridge 18 serves to prevent axial movement of the sleeve from the sealing element to ensure that the sleeve 23 is retained in position over the sealing element. The dimensions of the elastomeric sleeve 23 are such that on its application over the seal a radially compressive force is applied to the bushes and the sealing element. In addition during application of the sleeve 23 over the sealing element it is able to be stretched axially between the protrusions provided on opposed seals to provide for some axial compression of the sealing element 17. As a result the sleeve 23 serves to apply an axial force between the bushes and the sealing element such that the opposed axial faces of the sealing element and bushes and of each turn of the helix of the sealing element are held in close abutting relationship and because of their complementary configuration a sealing relationship is formed between them. In addition the radial compression which is applied to the sealing element 17 by the sleeve 23 and the resilient nature of the helix of the sealing element serves to ensure that the sealing element is clampingly received over the shaft 11 and further serves to enhance its sealing engagement with the shaft. Furthermore the capacity of the one bush 15 to radially expand or contract serves to ensure the application of a clamping force by the bush to maintain it in close abutting sealing relationship with the shaft. Furthermore if during use a fluid pressure is generated in the space between the exterior of the seal and the second element 12 the influence of such fluid pressure on the sleeve 23 serves to increase the clamping engagement of the sealing element and one bush 15 into closer abutting relationship with the shaft and enhance the sealing function.

Figure 3:
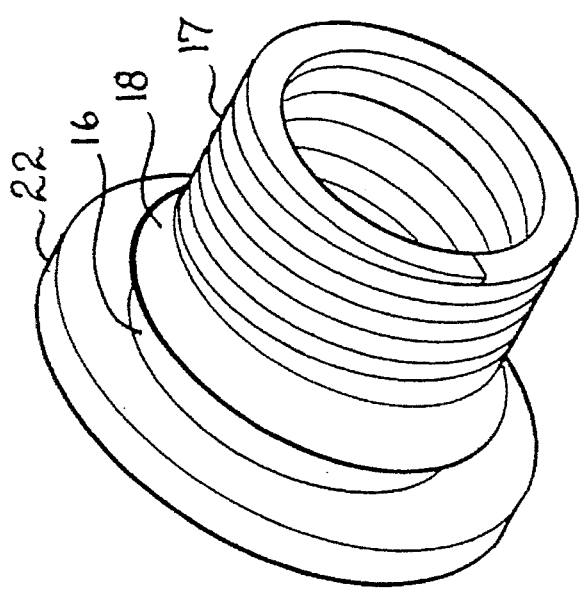

According to a second embodiment, as shown at FIG. 3, the one bush element 15 of the previous embodiment may be omitted and the elastomeric sleeve may be received over the axial end face of the helix.

Figure 4:
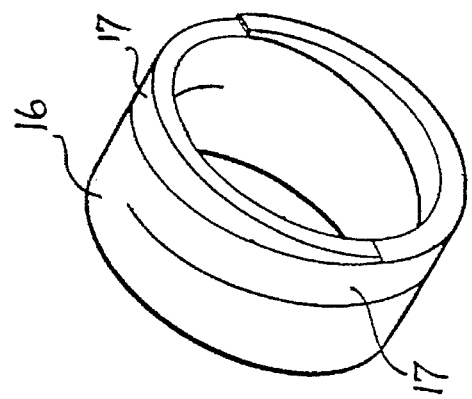
FIGS. 3 and 4 illustrate two further alternative embodiments.

According to a third embodiment, as shown at FIG. 4, of the invention the sealing element may comprise a double helix and each portion of the helix extends more than half way round the seal and overlaps with the other portion.

Figure 5:
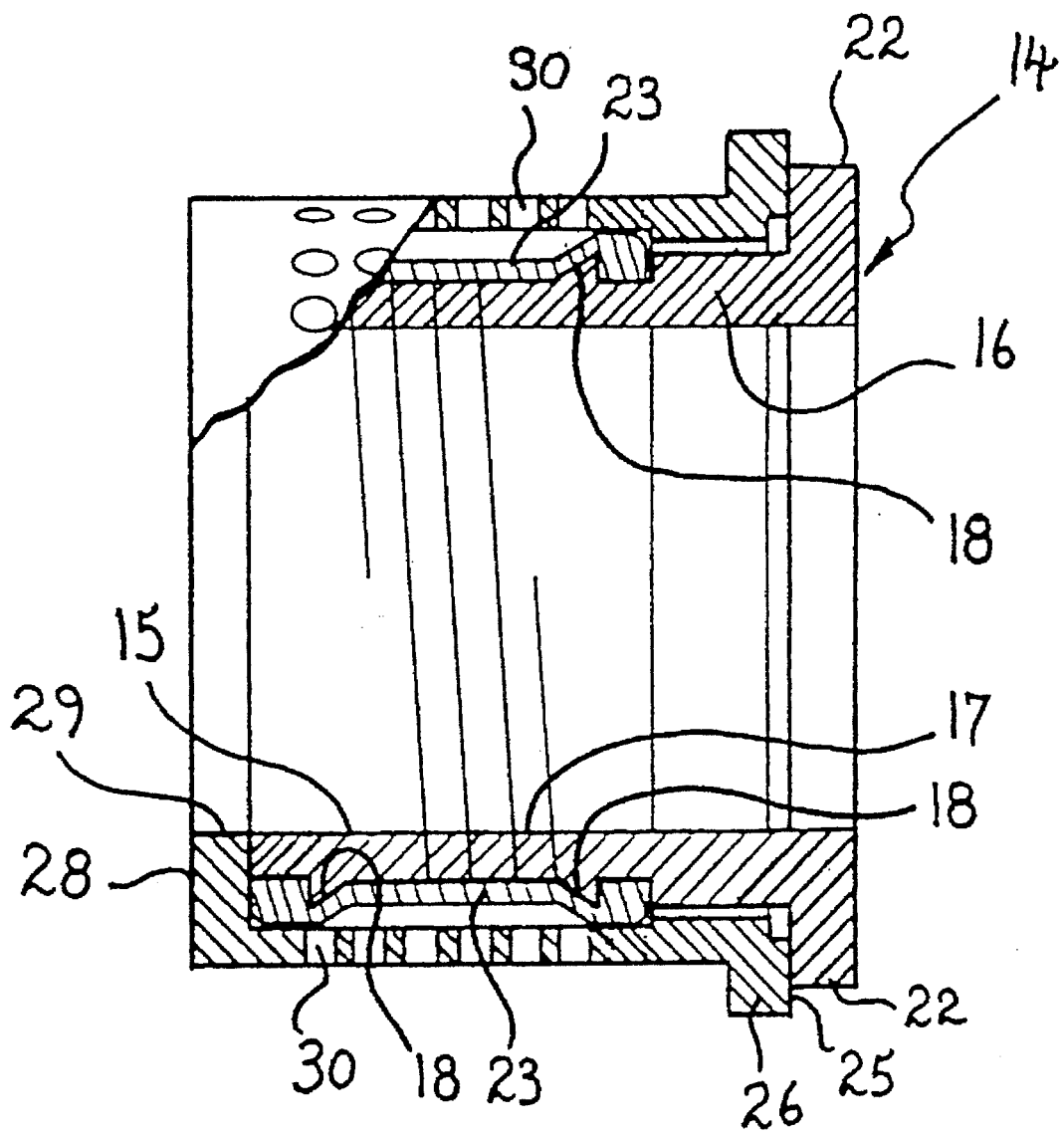
FIG. 5 is a schematic sectional elevation of a fourth embodiment.

The fourth embodiment at FIG. 5 relates to a seal of a similar form to that of the first embodiment and corresponding reference numerals have been used in FIG. 5 for identical components.

The difference in the case of the fourth embodiment relates to the presence of a shroud 24 which serves to protect the seal. The shroud is cylindrical and is dimensioned to be received over the assembled seal with some clearance. One end 25 of the shroud is open and abuts the flange 22 and is itself formed with an outwardly extending annular flange 26.

The other end 27 is formed with an opening 28 which is in close correspondence with the outer dimensions of the shaft (not shown) to ensure there is minimum clearance with the shaft. In addition the length of the shroud is such that when the seal 14 is received within it the outer end of the seal sealingly abuts with the inner face of the other end of the shroud.

In addition the inner diameter of the shroud corresponds substantially with the outer circumference of the seal.

The effect of such is to prevent the entry of particles in to the zone between the seal and the shaft. This is of relevance where the seal is used with fluids containing particulate material such as slurries.

To enable the fluid pressure to bear upon the elastomeric seal the circumferential wall of the shroud is formed with apertures 30.

The seal of the fourth embodiment provides a seal housing or cartridge which can be located over a shaft and within a housing where the flanges 22 and 26 of the seal and shroud are clamped together when the housing is assembled after location of the seal.

Figure 6:
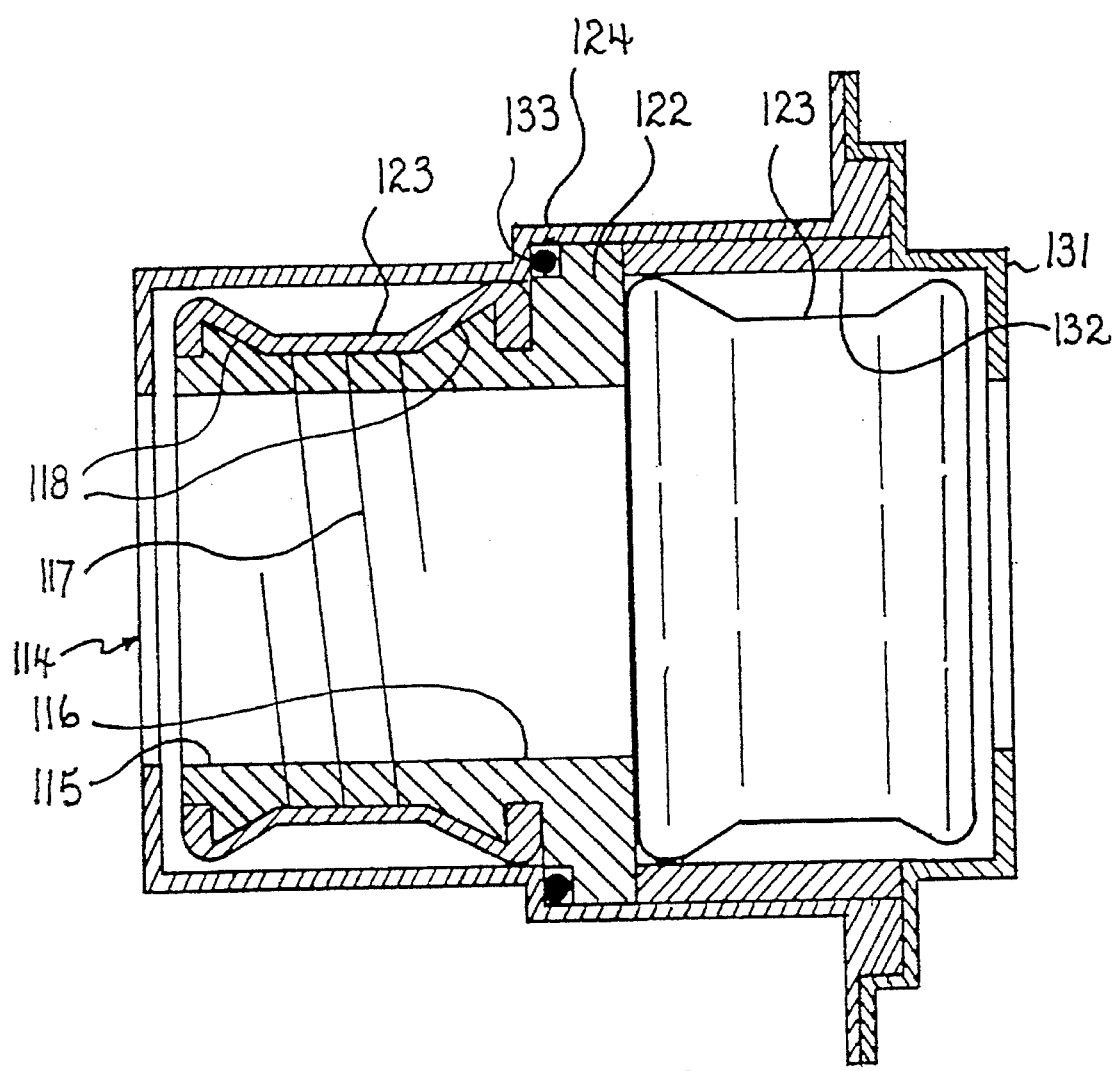
FIG. 6 is a schematic part sectional elevation of a fifth embodiment.

The seal of the fifth embodiment shown at FIG. 6 relates to a circumstance where a liquid is located to each side of the seal and it is necessary to prevent leakage of both liquids. The seal 114 two portions as such comprises two end bushes 115 (only one is shown) and a central bush 116 where the end bushes 115 are each separated from the central bush by helical sealing elements 117 (only one is shown) which are integral with the bushes. The portions of the seal are each of a similar form to the seal of the first embodiment where the other end bush 16 of the first embodiment takes the form of the central bush 116 which supports a flange 122 to enable clamping engagement in a housing.

A separate sleeve 123 is received over each sealing element and the annular ridge 11 of the adjacent bushes.

In the case of the fifth embodiment the seal 114 is accommodated in a shroud 124 which has a generally cylindrical configuration. The shroud has an open end with a diameter corresponding to the diameter of the flange 122 and comprises an outer portion corresponding in length to the width of the flange and a portion of the length of one portion of the seal. At the inner end of the outer portion the internal diameter of the inner portion of the shroud is reduced to be less than that of the flange 122 and greater than one of the portions of the seal. The length of the inner portion is a little greater than that of one portion of the seals. While the internal dimension of the shroud is such that the seals are received therein with some degree of clearance between the respective end of the seal and the inner axial face of the shroud and between the internal radial walls of the shroud and the seal. As a result the elastomeric sleeves to each side of the flange 122 are subjected to the fluid pressure which exists to each side of the seal.

The open face of the shroud is closed by an end cap 131 to retain the seal in position within the shroud. To clamp the flange 122 within the shroud an annular spacer 132 is located in the outer portion of the shroud between the end cap 131 and the shroud 122 and an O-ring seal 133 is located to the other side of the flange 122.

The seal of the fifth embodiment is dimensioned and configured to be received in a housing to sealingly accommodate a shaft in the housing where a liquid is located to each side of the seal.

Each of the embodiments described above can be used with a shaft which is capable of rotation and/or reciprocation with respect to a support housing.

In particular the invention need not be limited to the application described in relation to the embodiment in and is applicable to a circumstance where the reciprocating rotating element is outermost.

It should be appreciated that the scope of the present invention need not be limited to the particular scope of the embodiment described above.

We claim:

1. A seal for use between a pair of elements which are capable of relative movement with respect to each other where one element has a substantially circular cross section, said seal comprising a bush configured to be received in close abutting relationship with the one element and being associated at one end with a sealing element of corresponding cross-section, the radially outer circumferential face of said bush being formed with an annular ridge having a sloping face, said sealing element having a helical configuration, opposed axial faces of the helix are of complementary configuration and are in close abutting relationship, the opposed axial faces of the helix and said bush are of a complementary configuration and are in close abutting relationship, said bush and sealing element being integral and being formed of a resilient wear resistant material having a low coefficient of sliding friction and a high modulus of rigidity, a further bush is located at the other end of the sealing element and is integral with the other end of the sealing element, the radially outer circumferential face of said further bush being formed with an annular ridge having a sloping face, said seal further comprising an elastomeric sleeve extending over the radially outer circumferential face of the sealing element, over the annular ridges and beyond both ends of the sealing element, said sleeve applying a radial force to the seal in the direction of the one element and said sleeve being stretched axially and mechanically engaged with said sloping faces to supply an axially compressive force on the seal by elastomeric axial contraction of the sleeve, the bush being adapted to be supported by the other element.

2. A seal as claimed at claim 1 wherein the sealing element has the configuration of a single helix having a length in excess of one revolution.

3. A seal as claimed at claim 1 wherein the sealing element has the configuration of a double helix each helix being 180° out of phase with the other and having a length in excess of one-half of a revolution.

4. A seal as claimed at claim 1 wherein the further bush is circumferentially discontinuous and is capable of some resilient radial movement.

5. A seal as claimed at claim 1 wherein the radially outer circumferential face of each bush is formed with an annular ridge, said sleeve extending over the annular ridges.

6. A seal as claimed at claim 1 wherein the one element comprises a shaft and the other element comprises a housing, a seal being accommodated within a shroud supported from the housing to surround the seal shaft, said shroud being adapted to enable fluid to enter the space between the sleeve and the shroud.

7. A seal as claimed in claim 1 wherein the sealing element has the configuration of a single helix having a length in excess of one revolution.

8. A seal as claimed at claim 1 wherein the sealing element has the configuration of a double helix each helix being 180° out of phase with the other and having a length in excess of one-half of a revolution.

9. A seal as claimed at claim 7 wherein one bush is circumferentially discontinuous and is capable of some resilient radial movement.

10. A seal as claimed at claim 8 wherein one bush is circumferentially discontinuous and is capable of some resilient radial movement.

11. A seal as claimed at claim 7 wherein the radially outer circumferential face of each bush is formed within an annular ridge, said sleeve extending over the annular ridges.

12. A seal as claimed at claim 8 wherein the radially outer circumferential face of each bush is formed within an annular ridge, said sleeve extending over the annular ridges.

* * * * *